United States Patent [19]

Hamada et al.

[11] 4,086,992

[45] May 2, 1978

[54] CLUTCH CONTROL APPARATUS FOR AUTOMOTIVE DRIVELINE

[75] Inventors: Hideo Hamada; Masanori Mizote, both of Yokosuka, Japan

[73] Assignee: Nissan Motor Company, Limited, Japan

[21] Appl. No.: 694,950

[22] Filed: Jun. 11, 1976

[30] Foreign Application Priority Data

Jun. 13, 1975  Japan .................................. 50-72481

[51] Int. Cl.$^2$ ........................................... B60K 21/00
[52] U.S. Cl. .................................. 192/.076; 192/91 R
[58] Field of Search ....................... 192/.07, .075, .076, 192/91 R, 3.58

[56] References Cited

U.S. PATENT DOCUMENTS

| 2,086,576 | 7/1937 | Price et al. | 192/.075 |
| 3,536,176 | 10/1970 | Cappa | 192/.076 |
| 3,684,071 | 8/1972 | Wheymann | 192/3.58 |
| 3,709,340 | 1/1973 | Murakami et al. | 192/91 R |

*Primary Examiner*—Benjamin W. Wyche
*Attorney, Agent, or Firm*—Robert E. Burns; Emmanuel J. Lobato; Bruce L. Adams

[57] ABSTRACT

An apparatus for controlling an automatically operated clutch assembly for use with a manually operated power transmission system of an automotive driveline, comprising a fluid operated actuating mechanism for driving the clutch assembly between fully coupled and fully uncoupled conditions. A valve arrangement for controlling the operation of the clutch actuating mechanism and an electric control circuit for controlling the valve arrangement on the basis of signals representative of the vehicle speed and opening degree of the throttle valve in the mixture supply system of the engine. The control circuit is operative to control the valve arrangement so that the clutch actuating mechanism drives the clutch assembly at stepwise varying velocities in response to variation in the throttle valve opening degree when the clutch assembly is in a partially coupled condition.

6 Claims, 5 Drawing Figures

CLUTCH CONTROL APPARATUS FOR AUTOMOTIVE DRIVELINE

BACKGROUND OF THE INVENTION

The present invention relates to a clutch arrangement for an automotive driveline and particularly to an apparatus for controlling an automatically operated clutch assembly for use with a manually operated power transmission system of an automotive vehicle.

An automatically operated clutch assembly for automotive use is usually of a dry-disc friction type and difficulties have been encountered in putting such a clutch assembly to practical use primarily for the following reasons. One reason is that the pressure exerted between the driving and driven members of the clutch assembly cannot be controlled accurately during a partially coupled condition of the clutch assembly when the driving and driven members tend to slide on each other. Another reason is that the engine is restrained from delivering an output speed to match the position of the accelerator pedal when the driveline posterior to the clutch assembly is subjected to an increased load. When, furthermore, the clutch assembly is actuated repeatedly at short intervals, the temperature of the clutch disc is increased excessively and causes reduction of the friction between the clutch facings. This adds to the tendency of the driving and driven members of the clutch assembly to slide on each other and causes the engine to operate in an unloaded condition producing an extremely high output speed.

To avoid these problems, attempts have been made to provide an automatic clutch arrangement using a combination of a torque converter or a magneticparticle or centrifugal clutch assembly for the purpose of starting the vehicle from a halt and a dry-disc friction clutch for the shifting of gear positions in the transmission system. The clutch arrangement of this nature is controlled in dependence upon each individual clutch assembly and, for this reason, not only expensive control devices are required but there is a tendency that the manipulative efforts of the vehicle operator are ineffective. If, furthermore, a torque converter is utilized for the starting of the vehicle, the fuel consumption rate of the engine becomes far higher than in a vehicle using a manually operated clutch arrangement due to the sliding tendency between the driving and driven members of the torque converter. Such a drawback is also involved in a fluid-operated fully automated power transmission system.

SUMMARY OF THE INVENTION

It is, therefore, a prime object of the present invention to provide an automatically operated clutch arrangement using a single clutch assembly and nevertheless capable of producing satisfactory clutch actions when the vehicle is to be started from a halt.

It is another object of the invention to provide an automatically operated clutch arrangement in which the clutch assembly is driven toward the fully coupled condition at a rate which is controlled to stepwise vary in relation to variation in the opening degree of the throttle valve of the mixture supply system of the engine during starting of the vehicle.

In accordance with the present invention, there is provided an apparatus for controlling a clutch assembly which is operative between a fully coupled condition and a fully uncoupled condition through an allowance disengagement condition and a partial torque transmission condition, comprising a clutch actuating mechanism including a control chamber contractable and expansible between a maximum-volume condition producing the fully coupled condition in the clutch assembly and a minimum-volume condition producing the fully uncoupled condition in the clutch assembly, an electrically operated valve arrangement including a vacuum port for providing communication between the control chamber and a source of vacuum and a plurality of air ports each for providing communication between the control chamber and the open air, the vacuum port being open to develop vacuum in the control chamber for causing the control chamber to contract toward the minimum-volume condition thereof, said air ports having different cross sectional areas and being selectively opened to admit atmospheric air into the control chamber at different rates for causing the control chamber to expand at different rates and accordingly driving the clutch assembly at different velocities toward the fully coupled condition thereof, and an electric control circuit including clutch position detecting means responsive to transition of the clutch assembly between the allowance disengagement condition thereof and the partial torque transmission and throttle-valve position responsive means responsive to variation in the opening degree of the throttle valve of the mixture supply system for the engine, the control circuit being operative to cause the valve arrangement to close the aforesaid vacuum port in response to a predetermined condition in which the clutch assembly is to be coupled, the control circuit being further operative to cause the air port with the largest sectional area to open and communicate with the control chamber under the allowance disengagement condition of the clutch assembly and to close in response to the transition of the clutch assembly from the allowance disengagement condition into the partial torque transmission condition as detected by the clutch position detecting means and to cause the remaining air ports to selectively open and communicate with the control chamber for causing the control chamber to expand at stepwise varying rates in response to variation in the throttle opening degree detected by the throttle responsive means under the partial torque transmission condition of the clutch assembly.

The above-mentioned throttle-valve position responsive means may comprise a plurality of throttle-valve position sensors responsive to throttle valve opening degrees of different predetermined values. In this instance, the control circuit further comprises a vehicle speed sensor responsive to a vehicle speed of a predetermined level, the control circuit being operative to actuate the aforesaid valve arrangement to cause the control chamber to expand at a relatively low rate in response to a throttle valve opening degree smaller than all of the predetermined values during the partial torque transmission condition of the clutch assembly and at a relatively high rate for a predetermined period of time each time the throttle valve opening degree is increased beyond the value predetermined for each of the throttle valve sensors provided the vehicle speed detected by the vehicle speed sensor is lower than the predetermined level.

The clutch assembly to be controlled by the apparatus according to the present invention as constructed and arranged as above set forth may be of any of the types which are well known in the art, such as of the dry-disc friction type or the magneticparticle type or a centrifugal clutch, as will be understood as the description proceeds.

BRIEF DESCRIPTION OF THE DRAWINGS

The features and advantages of a clutch control apparatus according to the present invention will become more apparent from the following detailed description taken in conjunction with the accompanying drawings, in which.

DESCRIPTION OF THE PREFERRED EMBODIMENTS

Figure 1:
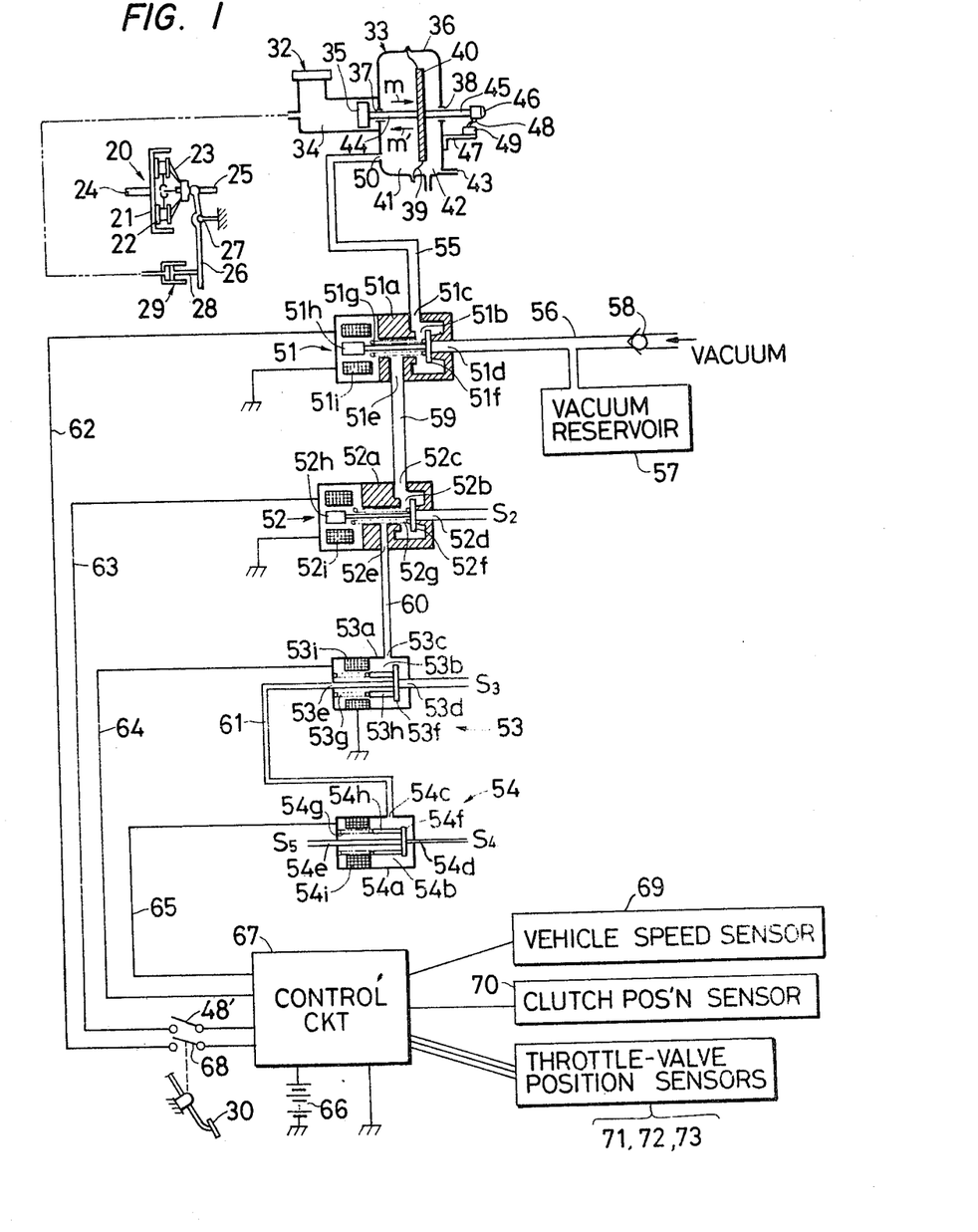
FIG. 1 is a schematic view showing, partly in block form, a sole preferred embodiment of the clutch control apparatus according to the present invention.

Referring to the drawings, first to FIG. 1, a clutch assembly 20 for use in an automotive driveline is schematically shown, by way of example, to be of the single-plate dry-disc friction type comprising a flywheel 21, a friction disc 22 and a spring loaded pressure plate 23. The flywheel 21 is rotatable with the crankshaft, partly shown at 24, of the engine while the friction disc 22 and the pressure plate 23 are rotatable with and axially movable on the transmission input shaft, a portion of which is shown at 25. A clutch actuating lever 26 is rotatable about a pivot 27 and is pivotally connected at one end to the pressure plate 23 of the clutch assembly 20 and at the other end to a piston 28 of a fluid-operated clutch actuating cylinder 29. The pressure plate 23 is biased by a spring action to hold the friction disc 22 in pressing engagement with the flywheel 21 and thus hold the clutch assembly 20 a coupled condition and is moved against the spring action to move the friction disc 22 out of engagement with the flywheel 21 and thus actuate the clutch assembly 20 into an uncoupled condition when a fluid pressure is developed in the cylinder 29 and causes the clutch actuating lever 26 to turn counterclockwise of the drawing about the pivot 27. The details of the construction and arrangement of the clutch assembly 20 and the associated actuating mechanism being well known in the art and being rather immaterial for the understanding of the present invention, no further description regarding the same will be unnecessary. Furthermore, the shown construction of the clutch assembly 20 is merely for the purpose of illustration and it will be understood, as the description proceeds, that the apparatus according to the present invention is applicable to any other type of clutch assembly ordinarily used in the driveline of an automotive vehicle. In FIG. 1, there are further shown an accelerator pedal 30 which is connected by a mechanical linkage to the throttle valve of the mixture supply system (not shown) of the engine for controlling the flow of air-fuel mixture (if the mixture supply system is of a carburetor type) or the flow of air (if the mixture supply system is of a fuel injection type) to be delivered into the intake manifold (not shown) of the engine, as is well known.

Now, an apparatus embodying the present invention comprises a master cylinder 32 and a vacuum-operated clutch actuator 33. The master cylinder 32 has a cylinder chamber 34 in which a piston 35 is axially movable back and forth. The cylinder chamber 34 is in communication with the above described clutch actuating cylinder 29. On the other hand, the vacuum operated clutch actuator 33 comprises a hollow casing 36 fixedly connected to the master cylinder 32 and formed with apertures 37 and 38 which are aligned with the cylinder chamber 34 in the master cylinder 32. The casing 35 has mounted therein an annular diaphragm element 39 which is secured along its outer circumferential end to the inner peripheral surface of the casing. The diaphragm element 39 is, in turn, connected along its inner circumferential end to a piston 40 and, thus, divides the internal space of the casing 36 into two complementarily contractable and expansible chambers 41 and 42 which will be hereinafter referred to as control and atmospheric chambers, respectively. The casing 36 is further formed with a vent 43 through which the atmospheric chamber 42 is constantly open to the atmosphere. The above-mentioned piston 40 is connected to the piston 35 in the master cylinder 32 by a connecting rod 44 extending from one face of the piston 40 into the cylinder chamber 34 through the control chamber 41 and the aperture 37 in the casing 36. A switch actuating plunger 45 extends from the other face of the piston 40 and axially projects out of the casing 36 through the atmospheric chamber 42 and the aperture 38 in the casing 36. The plunger 45 has secured to its projecting end portion a tapered contact breaker element 46 of dielectric material. The rod 44 and the plunger 45 are axially movable through the apertures 37 and 38, respectively, as the piston 40 is axially moved in the directions of arrowheads $m$ and $m'$, rightwardly and leftwardly of FIG. 1 between the apertures 37 and 38 with the diaphragm element 39 flexibly deformed accordingly. When the control chamber 41 is expanded and the piston 40 is moved in the direction of the arrowhead $m$, the fluid pressure in the master cylinder 32 and accordingly in the clutch actuating cylinder 29 is reduced and allows the clutch assembly 20 to couple by the spring force acting on the pressure plate 23 of the clutch assembly 20. The clutch assembly 20 is thus held in the fully coupled condition when the control chamber 41 of the clutch actuator 33 is expanded into a maximum-volume condition with the switch actuating plunger 45 held in the foremost axial position relative to the casing 36 as illustrated in FIG. 1. When, conversely, the control chamber 41 is contracted and the piston 40 is moved in the direction of the arrowhead $m'$, the fluid pressure in the master cylinder 32 and accordingly in the clutch actuating cylinder 29 is increased by the piston 35 of the master cylinder 32 so that the clutch assembly 20 is driven to be uncoupled against the spring force acting on the pressure plate 23 of the clutch assembly 20 by means of the clutch actuating lever 26. The clutch assembly 20 is fully coupled when the control chamber 41 of the clutch actuator 33 is contracted into a minimum-volume condition with the switch actuating plunger 45 moved into the rearmost axial position relative to the casing 36. The piston 40 and the switch actuating plunger 45 are biased to move in the direction of the arrowhead $m$ by the fluid pressure acting on the piston 35 in the master cylinder 32.

As is well known in the art, a clutch assembly is usually so arranged as to be progressively actuated from the fully uncoupled condition into the fully coupled condition. When, thus, the clutch assembly 20 is initiated into action to couple from the fully uncoupled condition, there is a certain amount of time interval before actual engagement is produced in the clutch assembly. The condition of a clutch assembly operative during such; a time interval is herein referred to as an allowance disengagement condition of the clutch operation. The allowance disengagement condition of the clutch is, in the arrangement of FIG. 1, in correspondence with a certain range of displacement of the switch actuating plunger 45. The particular range of the plunger displacement is herein referred to as the allowance disengagement range of the plunger 45. At the end of the allowance disengagement range of the switch actuating plunger 45 moved in the direction of the arrowhead m, the clutch assembly 20 is permitted to couple. The instant at which engagement is initially produced in the clutch assembly 20 is herein referred to as initial engagement point (IEP) in the movement of the switch actuating plunger 45. For some time after the switch actuating plunger 45 is moved in the direction of the arrowhead m past the above-mentioned initial engagement point, the driving and driven members of the clutch assembly 20, viz., the flywheel 21 and the friction disc 22 are allowed to slide on each other and are therefore made unable to transmit torque therebetween at a 100 percent efficiency. The range of the displacement of the switch actuating plunger 45 providing such a condition is herein called a partial torque transmission range. When the switch actuating plunger 45 is being moved within the partial torque transmission range, the clutch assembly 20 is in a partial torque transmission condition in which the torque transmitted from the driving member or flywheel 21 to the driven member or friction disc 22 in the clutch assembly 20 increases progressively as the plunger 45 is moved in the direction of the arrowhead m. At the end of the partial torque transmission range of the plunger displacement, the clutch assembly 20 is fully coupled and is thus enabled to transmit torque therethrough substantially at a 100 percent efficiency. The particular point of the plunger displacement is herein referred to as a full engagement point (FEP). The full engagement point of the plunger displacement is assumed to correspond to the previously mentioned foremost axial position of the plunger 45 but, if desired, there may be provided a slight allowance between the full engagement point and the foremost axial position of the plunger 45 so as to assure slip-free engagement between the driving and driven members of the clutch assembly 20. In contrast to the full engagement point of the plunger 45 as above defined, the point of displacement of the plunger 45 in correspondence with the previously mentioned rearmost axial position of the plunger is herein called the full disengagement point (EDP) in the movement of the plunger.

The casing 36 of the clutch actuator 33 has fixedly mounted thereon a bracket 47 which supports a pair of stationary contact elements 48 through an insulating member 49. The stationary contact elements 48 are biased, either by the elasticity of their own or by suitable biasing means engaging therewith, to be in contact with each other for providing electrical connection therebetween and are located to be engageable with the contact breaker element 46 on the switch actuating plunger 45 as the plunger 45 is moved back and forth together with the piston 40. When the switch actuating plunger 45 is moved in the direction of the arrowhead m' and is stopped in its rearmost axial position relative to the casing 36, the contact breaker element 46 on the plunger 45 is located rearwardly of the contact elements 48, which are consequently allowed to be in contact with each other and thus establish electrical connection therebetween. When the plunger 45 is moved in the direction of the arrowhead m into an intermediate axial position at a predetermined distance d from the rearmost axial position thereof, the contact breaker element 46 on the plunger 45 is brought into pressing engagement with the contact elements 48, which are consequently forced to be spaced apart and electrically disconnected from each other by the insulating contact breaker element 46 interposed therebetween. The contact elements 48 are held in these conditions as long as the switch actuating plunger 45 is located between the above-mentioned intermediate axial position and its foremost axial position relative to the casing 36. The plunger 45, contact breaker element 46 and stationary contact elements 48 are arranged so that the distance d of movement of the plunger 45 from the rearmost axial position thereof corresponds to the previously mentioned allowance displacement range of the plunger 45. The electrical connection between the contact elements 48 is thus interrupted when the switch actuating plunger 45 reaches the previously mentioned initial engagement point (IEP).

The casing 36 of the clutch actuator 33 is formed with a port 50 through which the control chamber 41 in the casing 36 is selectively brought into communication with a source of vacuum or with the open air under the control of a valve arrangement which comprises first, second, third and fourth solenoid-operated two-position valve units 51, 52, 53 and 54 as shown in FIG. 1.

The first valve unit 51 comprises a casing 51a formed with a valve chamber 51b and first, second and third ports 51c, 51d, and 51e. The first port 51c is in constant communication with the port 50 in the casing 36 of the clutch actuator 33 through a passageway 55. The second port 51d is in communication with a suitable source of vacuum such as for example the intake manifold (not shown) of the engine through a passageway 56 provided with a vacuum reservoir 57 and a one-way check valve 58 located upstream of the reservoir 57. A valve element 51f is movable within the valve chamber 51b between a first position closing the second port 51d and a second position closing the third port 51e. When the valve element 51f is in the first position, communication is provided between the first and third ports 51c and 51e through the valve chamber 51b which is isolated from the second port 51d by the valve element 51f, as illustrated in FIG. 1. When the valve element 51f is in the second position thereof, communication is established between the first and second ports 51c and 51d through the valve chamber 51b which is isolated from the third port 51e by the valve element 51f. The valve element 51f is urged to move toward the first position thereof by suitable biasing means such as a helical compression spring 51g seated at one end on the valve element 51f as shown. The valve element 51f is connected to a solenoid-operated plunger 51h which is partly surrounded by an exciting coil 51i and which is kept de-movable back and forth when the coil 51i is energized and de-energized. The plunger 51h is assumed to be in a position allowing the valve element 51f to be held in the first position thereof by the biasing force of the compression springer 51g. When the exciting coil 51i is energized, the plunger 51h is moved in a direction to move the valve element from the first position into the second position thereof against the force of the spring 51g. The first valve unit 51 is, thus, adapted to provide communication between the first and third ports 51c and 51e thereof when the exciting coil 51i is de-energized and between the first and second ports 51c and 51d thereof when the exciting coil 51i is energized.

The second, third and fourth valve units, 52, 53 and 54 are constructed essentially similarly to the above described first valve unit 51. The second valve unit 52 thus comprises a casing 52a formed with a valve chamber 52b and first, second and third ports 52c, 52d and 52e; a valve element 52f movable within the valve chamber 52b; a helical compression spring 52g acting on the valve element 52f; a solenoid-operated plunger 52h connected to the valve element 52f; and an exciting coil 52i for operating the plunger 52h. The first port 52c is in constant communication with the third port 51e of the first valve unit 51 through a passageway 59 and the second port 52d is open to the atmosphere. The valve element 52f is movable between a first position closing the second port 52d and a second position closing the third port 52e and is biased to move toward the first position thereof by the compression spring 52g. When the valve element 52f is in the first position thereof, communication is provided between the first and third ports 52c and 52e through the valve chamber 52b which is isolated from the second port 52d by the valve element 52f, as illustrated in FIG. 1. When the valve element 52f is in the second position thereof, communication is established between the first and second ports 52c and 52d through the valve chamber 52b which is isolated from the third port 52e by the valve element 52f. The valve element 52f is allowed to be in the first position thereof by the force of the compression spring 52g when the exciting coil 52i is de-energized and is moved from the first position into the second position thereof against the force of the spring 52g when the exciting coil 52i is energized. The second valve unit 52 is thus adapted to provide communication between the first and third ports 52c and 52e thereof when the exciting coil 52i is de-energized and between the first and second ports 52c and 52d when the coil 52i is energized.

The third valve unit 53 comprises a casing 53a formed with a valve chamber 53b and first, second and third ports 53c, 53d and 53e; a valve element 53f movable within the valve chamber 53b; a helical compression spring 53g acting on the valve element 53f; a solenoid-operated hollow plunger 53h connected to the valve element 53f; and an exciting coil 53i for operating the plunger 53h. The first port 53c is in constant communication with the third port 52e of the second valve unit 52 through a passageway 60 and the second port 53d is open to the atmosphere. The valve element 53f is movable between a first position closing the second port 53d and a second closing the third port 53e and is biased by the compression spring 53g to move toward the first position thereof. When the valve element 53f is in the first position thereof, communication is provided between the first and third ports 53c and 53e through the valve chamber 53b which is isolated from the second port 53d by the valve element 53f, as illustrated in FIG. 1. When the valve element 53f is in the second position thereof, communication is established between the first and second ports 53c and 53d through the valve chamber 53b which is isolated from the third port 53e by the valve element 53f. The valve element 53f is allowed to be in the first position thereof by the force of the compression spring 53g when the exciting coil 53i is de-energized and is moved from the first position into the second position thereof against the force of the spring 53g when the exciting coil 53i is energized. The third valve unit 53 is thus adapted to provide communication between the first and third ports 53c and 53e thereof when the exciting coil 53i is de-energized and between the first and second ports 53c and 53d thereof when the exciting coil 53i is energized.

The fourth valve units 54 comprises a casing 54a formed with a valve chamber 54b and first, second and third ports 54c, 54d and 54e; a valve element 54f movable within the valve chamber 54b; a helical compression spring 54g acting on the valve element 54f; a solenoid-operated hollow plunger 54h connected to the valve element 54f; and an exciting coil 54i for operating the plunger 54h. The first port 54c is in constant communication with the third port 53e of the third valve unit 53 through a passageway 61 while the second and third ports 54d and 54e are open to the atmosphere. The valve element 54f is movable between a first position closing the second port 54d and a second position closing the third port 54e and is biased by the compression spring 54g to move toward the first position thereof. When the valve element 54f is in the first position thereof, communication is provided between the first and third ports 54c and 54e through the valve chamber 54b which is isolated from the second port 54d by the valve element 54f, as illustrated in FIG. 1. When the valve element 54f is in the second position thereof, communication is established between the first and second ports 54c and 54d through the valve chamber 54b which is isolated from the third port 54e by the valve element 54f. The valve element 54f is allowed to be in the first position thereof by the force of the compression spring 54g when the exciting coil 54i is de-energized and is moved from the first position into the second position thereof against the force of the spring 54g when the exciting coil 54i is energized. The fourth valve unit 54 is thus adapted to provide communication between the first and third ports 54c and 54e thereof when the exciting coil 54i is de-energized and between the first and second ports 54c and 54d thereof when the exciting coil 54i is energized.

In the valve arrangement above described, the respective second ports 52d, 53d and 54d of the second, third and fourth valve units 52, 53 and 54 are calibrated so that the effective sectional area of the second port 53d of the third valve unit 53 is smaller than the effective sectional area of the second port 52d of the second valve unit 52 but is larger than the effective sectional area of the second port 54d of the fourth valve unit 54. If, thus, the effective sectional areas of the ports 52d, 53d and 54d of the second, third and fourth valve units 52, 53 and 54 are denoted by $S_2$, $S_3$, $S_4$, respectively, then the following relationship holds therebetween:

$$S_2 > S_3 > S_4.$$

Furthermore, the third port 54e of the fourth valve unit 54 is sized to have an effective sectional area $S_5$ smaller than the sectional area $S_3$ of the port 53d of the third valve unit 53 but larger than the sectional area $S_4$ of the second port 54d of the fourth valve unit 54, hence $$S_4 < S_5 < S_3.$$

For practical purposes, the second ports 52d, 53d and 54d of the second, third and fourth valve units 52, 53 and 54 may be about 5 mm, 1.2 mm and 0.3 mm, respectively, in diameter while the third port 54e of the fourth valve unit 54 may measure about 0.6 mm in diameter. The flow rates of air through the respective second ports 52d, 53d and 54d of the second, third and fourth valve units 52, 53 and 54 are represented by $f_1$, $f_2$, and $f_3$, respectively, and the flow rate of air through the third port 54e of the fourth valve unit 54 is represented by $f_5$. From the above discussion it is apparent that the following relation holds between these flow rates:

$$f_4 < f_5 < f_3 < f_2.$$

The first and third ports 51c and 51e of the first valve unit 51, the first port 52c of the second valve unit 52, the passageways 55 and 59 and the port 50 of the clutch actuator 33 are sized to have respective sectional areas which are substantially equal to or slightly larger than the sectional area $S_2$ of the second port 52d of the second valve unit 52.

The exciting coils 51i, 52i, 53i and 54i of the valve units 51, 52, 53 and 54 arranged as above described are electrically connected by lines 62, 63, 64 and 65, respectively, to the positive terminal of a d.c. power source 66 through a control circuit 67. An idling-on switch 68 is provided between the control circuit 67 and the line 62 leading from the coil 51i of the first valve unit 51 and likewise a stationary-contact switch 48' is provided between the control circuit 67 and the line 63 leading from the coil 52i of the second valve unit 52. The idling-on switch 68 is responsive to the movement of the accelerator pedal 30 and is adapted to close when the accelerator pedal 30 is in a position providing an idling condition in the engine. The stationary-contact switch 48' is constituted by the previously described stationary contact element 48 on the clutch actuator 33 and is thus open when the switch actuating plunger 45 is moved through a distance greater than the predetermined distance d from its rearmost axial position, viz., when the clutch assembly 20 is in the partial torque transmission condition beyond the initial engagement point IEP.

The control circuit 67 is operated on the basis of signals delivered from various sensors including a vehicle speed sensor 69, a clutch position sensor 70 and first, second and third throttle-valve position sensors 71, 72 and 73. The vehicle speed sensor 69 is responsive to the cruising speed of the vehicle and is adapted to produce a logic "1" output signal in response to a vehicle speed lower than a predetermined level and a logic "0" output signal in response to a vehicle speed higher than the predetermined level. The predetermined level of the vehicle speed is herein assumed, by way of example, to be approximately 15 killometers per hour. The clutch position sensor 70 is connected to the above-mentioned stationary-contact 48' and is arranged to produce a logic "1" output signal when the stationary-contact switch 48' is open and a logic "0" output signal when the switch 48' is closed. The first, second and third throttle-valve position sensors 71, 72 and 73 are adapted to produce logic "1" output signals when the opening degree of the carburetor throttle valve (not shown) is greater than prdetermined first, second and third values, respectively, which are greater in this sequence. The first, second and third values may be one eighth, three eights and six eighths, respectively, of the fully opening degree of the carburetor throttle valve. When the opening degree of the throttle valve is smaller than the predetermined first value, all the first, second and third throttle-valve position sensors 71, 72 and 73 produce logic "0" output signals. When the throttle valve opening degree is smaller than the predetermined second value but larger than the predetermined first value, the first throttle-valve position sensor 71 produce the logic "1" output signal and the second and third throttle-valve position sensors 72 and 73 produce the logic "0" output signals. When the throttle valve opening degree is smaller than the predetermined third value but larger than the predetermined second value, the first and second throttle-valve position sensors 71 and 72 produce the logic "1" output signals and the third throttle-valve position sensor 73 produces the logic "0" output signal. When the throttle valve opening degree is larger than the predetermined third value, then all the throttle-valve position sensors 71, 72 and 73 produce the logic "1" output signals.

Figure 2:
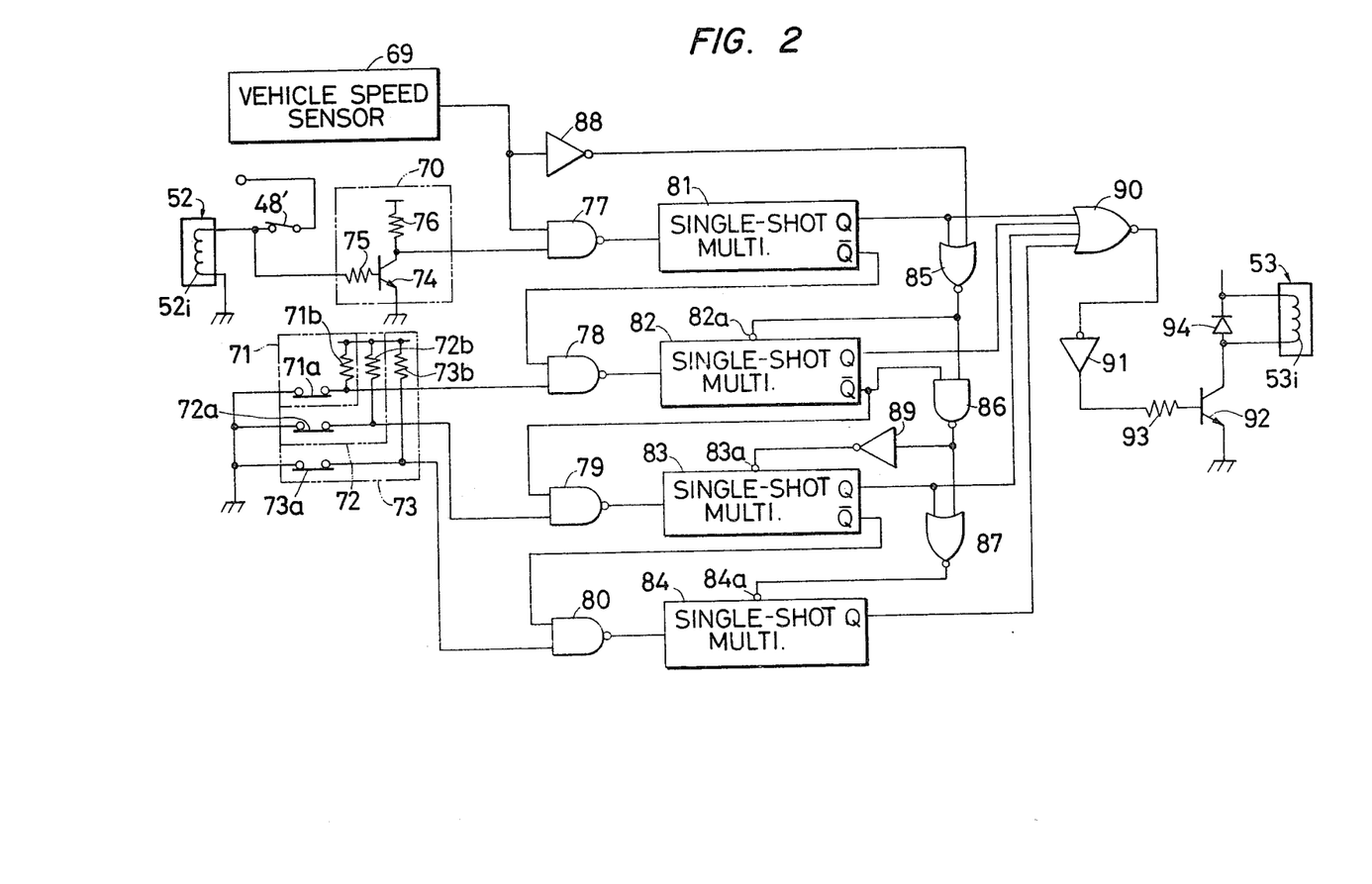
FIG. 2 is a diagram showing a preferred example of the circuit arrangement forming part of an electric control circuit incorporated into the embodiment illustrated in FIG. 1.

FIG. 2 illustrates a preferred example of the circuit arrangement forming part of the above-mentioned control circuit 67. The circuit arrangement shown in FIG. 2 is connected to the exciting coil 53i of the third valve unit 53 and is adapted to control the third valve unit 53 when the vehicle is being started from a halt. In the circuit arrangement of FIG. 2, the abovementioned clutch position sensor 70 is shown constituted by a transistor inverter which consists of a transistor 74 having its base connected through a resistor 75 and across the stationary-contact switch 48' to the d.c. power source 66 (FIG. 1). The transistor 74 has its emitter grounded and its collector connected through a resistor 76 to the d.c. power source. When the stationarycontact switch 48' is open, the base of the transistor 74 is de-energized so that the transistor 74 is maintained nonconductive and, as a consequence, a positive potential is impressed on the collector electrode of the transistor 74. When the stationary-contact switch 48' is closed, the base of the transistor 74 is energized so that the transistor 74 becomes conductive and as a consequence the collector of the transistor 74 is connected to ground. The transistor inverter constituting the clutch position sensor 70 thus produces the logic "1" output signal when the stationary-contact switch 48' is open and the logic "0" output signal when the switch 48' is closed. On the other hand, the previously mentioned first, second and third throttlevalve position sensors 71, 72 and 73 are shown in FIG. 2 as comprising normally-closed contact sets 71a, 72a and 73a, respectively, which are connected in parallel with each other between ground and the positive terminal of the d.c. power source 66 (FIG. 1) through resistors 71b, 72b and 73b, respectively. The first, second and third throttle-position sensors 71, 72, and 73 are arranged so that the respective normally-open contact sets 71a, 72a and 73a thereof are closed in response to a throttle valve opening degree smaller than the previously mentioned predetermined first, second and third values, respectively.

The circuit arrangement shown in FIG. 2 comprises first, second, third and fourth logic "NAND" gate circuits 77, 78, 79 and 80 each having two input terminals and first, second, third and fourth single-shot multivibrators 81, 82, 83 and 84 each having first and second output terminals Q and Q' at which logic "1" and "0" output signals of the multivibrator are to appear alternately. If each of the single-shot multivibrators 81 to 84 is constructed of a bridge network using two transistors, the terminals Q and Q' of each multivibrator may be respectively constituted by the collectors of the transistors so that if a logic "1" output signal appears at one of the output terminals Q and Q' then a logic "0" signal appears at the other output terminal. The first "NAND" gate circuit 77 has a first input terminal connected to the output terminal of the previously mentioned vehicle speed sensor 69 and a second input terminal connected to the collector of the transistor 74 of the clutch position sensor 70. The first "NAND" gate circuit 77 is operative to produce a logic "1" at its output terminal except when the vehicle speed detected by the vehicle speed sensor 69 is lower than the predetermined level of 15 millimeters per hour and, in addition, the stationary-contact switch 48' is open to hold the transistor 74 nonconductive. The output terminal of the first "NAND" gate circuit 77 is connected to the trigger terminal of the first single-shot multivibrator 81. The second logic "NAND" gate circuit 78 has a first input terminal connected to the second output terminal Q' of the first single-shot multivibrator 81 and a second input terminal connected to a node between the contact set 71a and resistor 71b constituting the first throttle-valve position sensor 71. The second "NAND" circuit 78 is thus operative to produce a logic "1" signal at its output terminal except when a logic "1" signal is appearing at the second output terminal Q' of the first single-shot multivibrator 81 and, in addition, the contact set 71a of the first throttle-valve position sensor 71 is open so that a logic "1" signal is appearing at the second input terminal of the "NAND" gate circuit 78. The output terminal of the second "NAND" gate circuit 78 is connected to the trigger terminal of the second single-shot multivibrator 82. The third logic "NAND" gate circuit 79 has a first input terminal connected to the second output terminal Q' of the second single-shot multivibrator 82 and a second input terminal connected to a node between the contact set 72a and resistor 72b constituting the second throttle-valve position sensor 72. The third "NAND" gate circuit 79 is thus operative to produce a logic "1" signal at its output terminal except when a logic "1" signal is appearing at the second output terminal Q' of the second single-shot multivibrator 82 and, in addition, the contact set 72a of the second throttle-valve position sensor 72 is open so that a logic "1" signal is appearing at the second input terminal of the "NAND" gate circuit 79. The output terminal of the third "NAND" gate circuit 79 is connected to the trigger terminal of the third single-shot multivibrator 83. The fourth logic "NAND" gate circuit 80 has a first input terminal connected to the second output terminal Q' of the third single-shot multivibrator 83 and a second input terminal connected to a node between the contact set 73a and resistor 73b of the third throttlevalve position sensor 73. The fourth "NAND" gate circuit 80 is thus operative to produce a logic "1" signal at its output terminal except when a logic "1" signal is appearing at the second output terminal Q' of the third single-shot multivibrator 83 and, in addition, the contact set 73a of the third throttlevalve position sensor 73 is closed so that a logic "1" signal is appearing at the second input terminal of the "NAND" gate circuit 80. The output terminal of the fourth "NAND" gate circuit 80 is connected to the trigger terminal of the fourth single-shot multivibrator 84. The second, third and fourth single-shot multivibrators 82, 83 and 84 have clear terminals 82a, 83a and 84a, respectively. When a logic "0" signal is being impressed on each of these clear terminals 82a, 83a and 84a, each of the single-shot multivibrators 82, 83 and 84 is locked in an inoperative condition so that logic "0" signals appear at both of its first and second output terminals Q and Q'.

The circuit arrangement of FIG. 2 further comprises a series combination of a first logic "NOR" gate circuit 85, a fifth logic "NAND" gate circuit 86 and a second logic "NOR" gate circuit 87, each of the circuits 85, 86 and 87 having two input terminals. The first logic "NOR" gate circuit 85 has a first input terminal connected via a logic "NOT" gate circuit 88 to the output terminal of the vehicle-speed sensor 69 and a second input terminal connected to the first output terminal Q of the first single-shot multivibrator 81. The first "NOR" gate circuit 85 is thus operative to produce a logic "0" signal at its output terminal except when logic "0" signals are impressed on both of its first and second input terminals. The output terminal of the first "NOR" gate circuit 85 is connected on one hand to the clear terminal 82a of the second single-shot multivibrator 82 and on the other hand to a first input terminal of the fifth "NAND" gate circuit 86 which has a second input terminal connected to the second output terminal Q' of the second single-shot multivibrator 82. The fifth "NAND" gate circuit 86 is thus operative to produce a logic "1" signal at its output terminal except when the first "NOR" circuit 85 is conditioned to deliver a logic "1" output signal and concurrently the second single-shot multivibrator 82 is conditioned to deliver a logic "1" signal at its second output terminal Q'. The output terminal of the fifth "NAND" gate circuit 86 is connected on one hand to the clear terminal 83a of the third single-shot multivibrator 83 through a logic "NOT" gate circuit 89 and on the other hand to a first input terminal of the second "NOR" gate circuit 87 which has a second input terminal connected to the first output terminal Q of the third single-shot multivibrator 83. The second "NOR" gate circuit 87 is thus operative to produce a logic "0" signal at its output terminal except when the fifth "NAND" gate circuit 86 is conditioned to deliver a logic "0" signal and concurrently the third single-shot multivibrator 83 is conditioned to produce a logic "0" signal at its first output terminal Q. The respective first output terminals Q of the first, second, third and fourth single-shot multivibrators 81, 82, 83 and 84 are connected to first, second, third and fourth input terminals of a third logic "NOR" gate circuit 90. The third "NOR" gate circuit 90 is thus operative to deliver a logic "0" output signal when a logic "1" signal is impressed on at least one of the four input terminals thereof. The output terminal of the third "NOR" gate circuit 90 is connected through a logic "NOT" gate circuit 91 to the exciting coil 53i of the third valve unit 53 through a transistor amplifier consisting of a transistor 92 having a base connected through a resistor 93 to the output terminal of the "NOT" gate circuit 91, an emitter grounded, and a collector connected across the exciting coil 53i through a diode 94, as shown.

The operation of the embodiment of FIG. 1 will be hereinafter described with concurrent reference to FIGS. 1 and 2 and further to FIGS. 3A and 3C which illustrate the motions of the switch actuating plunger 45 of the clutch actuator 33 shown in FIG. 1.

When, now, the engine is operating at idle, the idling-on switch 68 is kept closed so that the exciting coil 51i of the first valve unit 51 is energized from the d.c. power source 66. The valve element 51f is moved against the force of the compression spring 51g into its second position providing communication between the first and second ports 51c and 51d through the valve chamber 51b. The vacuum passageway 56 leading from the engine intake manifold (not shown) is now allowed to communicate with the control chamber 41 of the clutch actuator 33 through the second and first ports 51d and 51c of the valve unit 51 and the passageway 55 so that air in the control chamber 41 is drawn into the vacuum passageway 56. Vacuum is now developed in the control chamber 41, which consequently is caused to contract and move the piston 35 of the master cylinder 32 in a direction to cause the clutch assembly 20 to be uncoupled. When the control chamber 41 is contracted into the minimum-volume condition and the switch actuating plunger 45 reaches its rearmost axial position, the clutch assembly 20 is fully uncoupled. The displacement of the switch actuating plunger 45 thus moved from the full engagement point FEP to the full disengagement point FDP is indicated by line A-B of the plot shown in FIG. 3A.

When the switch actuating plunger 45 is held in the rearmost axial position providing the full disengagement point FDP, the contact breaker element 46 on the switch actuating plunger 45 is disengaged from the stationary contact elements 48. The stationary contact elements 48 are thus held in contact with each other and accordingly the stationary-contact switch 48' is kept closed. The exciting coil 52i of the second valve unit 52 is therefore energized from the d.c. power source 66 through the switch 48' so that the valve element 52f of the valve unit 52 is held in the second position providing communication between the first and second ports 52c and 52d.

When the accelerator pedal 30 is depressed to start the vehicle from these conditions, the idling-on switch 68 is opened and de-energizes the exciting coil 51i of the first valve unit 51, establishing communication between the first and third ports 51c and 51e of the valve unit 51. Under these conditions, the contact breaker element 46 on the switch actuating plunger 45 remains disengaged from the stationary contact elements 48 so that the exciting coil 52i of the second valve unit 52 is energized from the d.c. power source 66 through the stationary-contact switch 48' and provides communication between the first and second ports 52c and 52d of the second valve unit 52. Atmospheric air is therefore admitted at a rate $f_2$ into the control chamber 41 of the clutch actuator 33 through the second port 52d of the second valve unit 52. The switch actuating plunger 45 is accordingly moved in the direction of the arrow m at a velocity proportional to the flow rate $f_2$ as indicated by the line C-D$_1$ of the plot shown in FIG. 3A. When the switch actuating plunger 45 is brought into engagement with the stationary contact elements 48 and causes the stationary-contact switch 48' to open, the exciting coil 52i of the second valve unit 52 is de-energized so that the second port 52d of the valve unit 52 is closed and communication is provided between the first and third ports 52c and 52e of the valve unit 52. The switch actuating plunger 45 is situated now at the initial engagement point IEP as indicated at the point D$_1$ of the plot shown in FIG. 3A with the clutch assembly 20 in a partial torque transmission condition.

The stationary-contact switch 48' being thus open, the first "NAND" gate circuit 77 of the circuit arrangement shown in FIG. 2 is supplied with a logic "1" signal at its second input terminal. During an incipient stage after the vehicle has been started from a halt, the vehicle speed is lower than 15 kilometers per hour so that the vehicle speed sensor 69 is producing the logic "1" output signal thereof. The first "NAND" gate circuit 77 is therefore supplied with a logic "1" signal at its first input terminal.

The first "NAND" gate circuit 77 is now conditioned to produce a logic "0" signal at its output terminal with the logic "1" signals impressed on both of its first and second input terminals. The first single-shot miltivibrator 81 is triggered by the logic "0" output signal of the "NAND" gate circuit 77 and delivers a pulse P$_1$ having a positive polarity and a predetermined pulsewidth from its first output terminal Q. With a logic "1" signal thus impressed on its first input terminal, the "NOR" gate circuit 90 subsequent to the first single-shot multivibrator 81 produces a logic "0" output signal. The "NOT" gate circuit 91 is thus conditioned to produce a logic "1" signal at its output terminal and energizes the exciting coil 53i of the third valve unit 53. The third valve unit 53 is now in a condition providing communication between the first and second ports 53c and 53c thereof so that atmospheric air is admitted into the control chamber 41 of the clutch actuator 33 at a rate $f_3$ through the second port 53d of the valve unit 53. The switch actuating plunger 45 of the clutch actuator 33 is therefore moved beyond the initial engagement point IEP at a velocity proportional to the flow rate $f_3$ which is smaller than the previously mentioned flow rate $f_2$. The plunger 45 is thus moved in the partial torque transmission range as indicated by line D$_1$-D$_2$ of the plot shown in FIG. 3A for a period of time corresponding to the duration of the pulse P$_1$ delivered from the first single-shot multivibrator 81.

The logic "1" signal appearing at the first output terminal Q of the first single-shot multivibrator 81 is also fed to the second input terminal of the first "NOR" gate circuit 85. The "NOR" gate circuit 85 is therefore conditioned to deliver a logic "0" output signal to the clear terminal 82a of the second single-shot multivibrator 82 and to the first input terminal of the fifth "NAND" gate circuit 86. While the first single-shot multivibrator 81 is producing the logic "1" signal at its first output terminal Q, a logic "0" signal is delivered from the second output terminal Q' of the multivibrator 81 to the first input terminal of the second "NAND" gate circuit 78. The second "NAND" gate circuit 78 is therefore held in a condition producing a logic "1" output signal and, thus, the second single-shot multivibrator 82 is maintained inoperative with the logic "1" signal impressed on its trigger terminal and with the logic "0" signal impressed on its clear terminal 82a. The fifth "NAND" gate circuit 86 is therefore supplied with logic "0" signals at both of its first and second input terminals and delivers a logic "1" output signal to the second "NOR" gate circuit 87 which is accordingly held in a condition producing a logic "0" output signal. The logic "1" output signal delivered from the fifth "NAND" gate circuit 86 is inverted into a logic "0" signal by the "NOT" gate circuit 89 and is fed to the clear terminal 83a of the third single-shot multivibrator 83. Under these conditions, the logic "0" signal appearing at the second output terminal Q' of the second single-shot multivibrator 82 is supplied to the first input terminal of the third "NAND" gate circuit 79 which is therefore held in a condition producing a logic "1" output signal. The third singleshot multivibrator 83 is thus maintained in an inoperative condition. The second "NOR" gate circuit 87 being operative to produce the logic "0" output signal as above described, a logic "0" signal is impressed on the clear terminal 84a of the fourth single-shot multivibrator 84. Since, furthermore, the fourth "NAND" gate circuit 80 is held in a condition producing a logic "1" output signal in response to the logic "0" signal applied to the first input terminal thereof, the fourth single-shot multivibrator 84 is also maintained in an inoperative condition. The second, third and fourth single-shot multivibrators 82, 83 and 84 are thus all maintained in the inoperative conditions when the first single-shot multivibrator 81 is in a condition delivering the pulse $P_1$ from its first output terminal Q.

Simultaneously when the pulse $P_1$ from the first output terminal Q of the first single-shot multivibrator 81 lapses, the multivibrator 81 is conditioned to deliver a logic "0" signal from its first output terminal Q to the second input terminal of the first "NOR" gate circuit 85 and a logic "1" signal from its second output terminal Q' to the first input terminal of the second "NAND" gate circuit 78. The first "NOR" gate circuit 85 is now supplied with logic "0" signals at both of its first and second input terminals with the logic "1" signal from the vehicle speed sensor 69 inverted into a logic "0" signal by the "NOT" gate circuit 88 and delivers a logic "1" signal to the first input terminal of the fifth "NAND" gate circuit 86 and to the clear terminal 82a of the second single-shot multivibrator 82. The second single-shot multivibrator 82 is now ready to be initiated into action. If, under these conditions, the accelerator pedal 30 has been depressed through such a distance as to provide a throttle valve opening degree greater than the predetermined first value but smaller than the predetermined second value as previously mentioned, the contact set 71a of the first throttle-valve position sensor 71 is open and the respective contact sets 72a and 73a of the second and third throttle-valve position sensors 72 and 73 are closed so that a logic "1" signal appears at the second input terminal of the second "NAND" gate circuit 78 with a logic "0" signal appearing at each of the second input terminals of the third and fourth "NAND" gate circuits 79 and 80 in the circuit arrangement of FIG. 2. The second "NAND" gate circuit 78 is now supplied with the logic "1" signals at both of its first and second input terminals and is allowed to deliver a logic "0" output signal to the trigger terminal of the second single-shot multivibrator 82. The multivibrator 82 is driven to produce at its first output terminal Q a pulse $P_2$ having a positive polarity and a predetermined pulsewidth. The logic "1" signal thus delivered from the first output terminal Q of the second single-shot multivibrator 82 is fed to the second input terminal of the third "NOR" gate circuit 90 which is accordingly conditioned to produce a logic "0" output signal. The exciting coil 53a of the third valve unit 53 is therefore maintained energized for a period of time corresponding to the duration of the pulse $P_2$ subsequent to the pulse $P_1$ previously delivered from the first output terminal Q of the first single-shot multivibrator 81. The switch actuating plunger 45 of the clutch actuator 33 shown in FIG. 1 is thus kept moved in the partial torque transmission range as indicated by line $D_2$-$E_1$ of the plot shown in FIG. 3A.

Figure 3A:
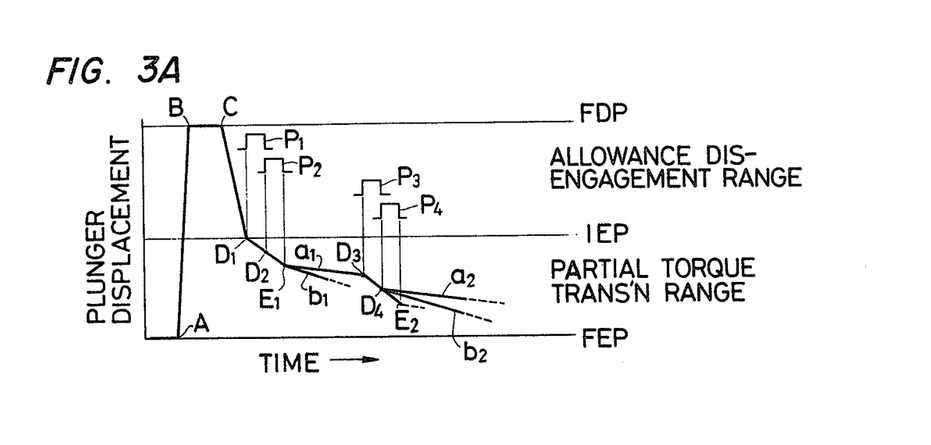
FIGS. 3A, 3B and 3C are diagrams showing plots which indicate different examples of the performance characteristics that are achievable in the embodiment of FIG. 1 by the use of the circuit arrangement illustrated in FIG. 2.

If the accelerator pedal is in a position providing a throttle valve opening degree smaller than the predetermined second value such as three eighths of the fully opening degree at the time when the point $E_1$ of the plot shown in FIG. 3A is reached by the switch actuating plunger 45, the respective contact sets 72a and 73a of the second and third throttle-valve position sensors 72 and 73 are kept closed and as a consequence the logic "0" signals are maintained at the respective second input terminals of the third and fourth "NAND" gate circuits 79 and 80, which are therefore held in the conditions producing the logic "1" output signals. On the other hand, the logic "0" output signal being delivered from the second output terminal Q' of the second single-shot multivibrator 82 maintains the fifth "NAND" gate circuit 86 in the condition producing the logic "1" output signal. The third and fourth single-shot multivibrators 83 and 84 are therefore kept inoperative, establishing logic "0" signals at their respective first output terminals Q. The "NOR" gate circuit 90 is thus maintained in a condition producing a logic "1" output signal and as a consequence the exciting coil 53a of the third valve unit 53 is kept de-energized after the time point at which the pulse $P_2$ from the second single-shot multivibrator 82 is disappeared. The third valve unit 53 is now shifted into the condition closing the second port 53d and providing communication between the first and third ports 53c and 53e thereof. Under these conditions, the switch actuating plunger 45 of the clutch actuator 33 is driven toward the full engagement point FEP at a velocity proportional to either the flow rate $f_4$ through the second port 54d of the fourth valve unit 54 or the flow rate $f_5$ through the third port 54e of the valve unit 54 as indicated by line $a_1$ or $b_1$, respectively, in the plot of FIG. 3A depending upon whether the exciting coil 54i of the fourth valve unit 54 is energized or de-energized. This condition is maintained as long as the accelerator pedal 30 is held in a position providing a throttle valve opening degree smaller than the predetermined second value which may be three eighths of the fully opening degree.

If the accelerator pedal 30 is depressed deeper so that the opening degree of the carburetor throttle valve reaches the predetermined second value during the condition in which the clutch actuator 33 is being operated by the air passed through the second or third port 54d or 54e of the fourth valve unit 54, then the contact set 72a of the second throttle-valve position sensor 72 is made open so that the sensor 72 delivers a logic "1" output signal to the second terminal of the third "NAND" gate circuit 79 of the circuit arrangement shown in FIG. 2. If, in this instance, the vehicle speed is still lower than the predetermined level of 15 killometers per hour maintaining the logic "0" signal at the first input terminal of the first "NOR" gate circuit 85, the fifth "NAND" gate circuit 86 is in a condition producing a logic "0" output signal in the presence of the logic "1" signals at both of its first and second input terminals. The logic "0" output signal of the "NAND" gate circuit 86 is inverted by the "NOT" gate circuit 89 into a logic "1" signal, which is fed to the clear terminal 83a of the third single-shot multivibrator 83. Under these conditions, the third "NAND" gate circuit 79 is producing a logic "0" output signal in the presence of the logic "1" signals at both of its first and second input terminals. The third single-shot multivibrator 83 is therefore caused to deliver a pulse $P_3$ having a positive polraity and a predetermined pulsewidth from its output terminal Q, causing the subsequent "NOR" gate circuit 90 to produce a logic "0" output signal. The "NOT" gate circuit 91 is thus operative to produce a logic "1" output signal and energizes the exciting coil 53i of the third valve unit 53 for a period of time corresponding to the pulsewidth of the above-mentioned pulse $P_3$. The switch actuating plunger 45 of the clutch actuator 33 is therefore moved at a velocity proportional to the flow rate $f_3$ of air through the second port 53d of the valve unit 53 as indicated by line $D_3$–$D_4$ of the plot shown in FIG. 3A. When the third single-shot multivibrator 83 is in the condition producing the pulse $P_3$ from its first output terminal Q, logic "0" signals are fed to the clear terminal 84a of the fourth single-shot multivibrator 84 and the first input terminal of the fourth "NAND" gate circuit 80 from the second output terminal Q' of the third single-shot multivinrator 83 and the output terminal of the second "NOR" gate circuit 87, respectively. The fourth single-shot multivibrator 84 is thus kept inoperative when the third single-shot multivibrator 83 is in a condition producing the pulse $P_3$. Upon lapse of the pulse $P_3$, logic "1" signals are impressed on the first input terminal of the fourth "NAND" gate circuit and the clear terminal 84a of the fourth single-shot multivibrator 84. If the throttle valve 30 is in a position providing a throttle valve opening degree larger than six eighths of the fully opening degree at an instant when the pulse $P_3$ from the third single-shot multivibrator 83 is disappeared, the fourth "NAND" gate circuit 80 is conditioned to produce a logic "0" output signal in the presence of the logic "1" signal at both of its first and second input terminals. The fourth single-shot multivibrator 84 is now triggered to deliver a pulse $P_4$ having a positive polraity and a predetermined pulsewidth to the fourth input terminal of the subsequent "NOR" gate circuit 90. The exciting coil 53i of the third valve unit 53 is therefore kept energized for a period of time corresponding to the duration of the pulse $P_4$ so that the switch actuating plunger 45 of the clutch actuator 33 is further moved as indicated by line $D_4$–$E_2$ of the plot shown in FIG. 3A at a velocity proportional to the flow rate $f_3$ of air through the second port 53d of the third valve unit 53. Upon lapse of the pulse $P_4$, logic "0" signals are present at all of the first to fourth input terminals of the third "NOR" gate circuit 90 of the circuit arrangement of FIG. 2 with the result that the exciting coil 53i of the third valve unit 53 is maintained de-energized.

If, however, the accelerator pedal 30 is held in a position providing a throttle valve opening degree smaller than the predetermined second valve at the time point when the pulse $P_3$ from the third single-shot multivibrator 84 is disappeared, the exciting coil 53i of the third valve unit 53 is de-energized at the instant represented by point $D_3$ in the plot of FIG. 3A so that the switch actuating plunger 45 in the clutch actuator 33 is driven toward the full engagement point FEP at the velocity proportional to the flow rate $f_4$ or $f_5$ of air through the second or third port 54d or 54e of the fourth valve unit 54 as indicated by line $a_2$ or $b_2$, respectively from the point $D_3$ in the plot of FIG. 3A, until the switch actuating plunger 45 reaches the full engagement point FEP and the clutch assembly 20 is fully coupled.

Figure 3B:
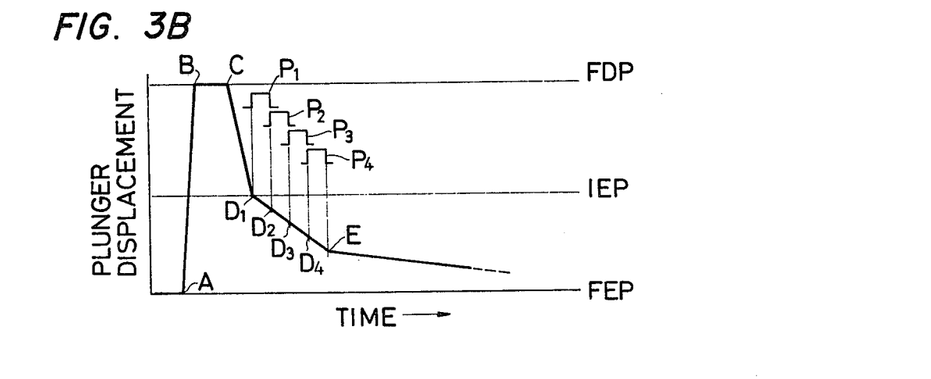
Figure 3C:
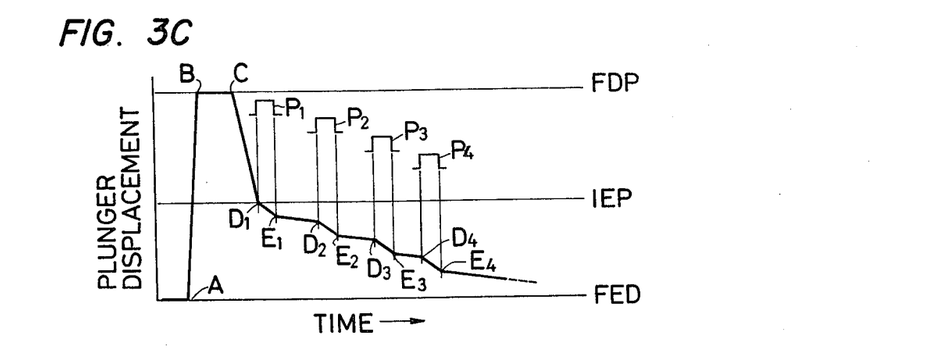

The plot C-$D_1$-$D_2$-$E_1$-$D_3$-$D_4$ shown in FIG. 3A is achieved when the accelerator pedal 30 is depressed first rapidly and then relatively slowly from the released position thereof. If, however, the accelerator pedal 30 is kept depressed rapidly from the released position so that the throttle valve opening degree exceeds the predetermined third value providing six eighths of the fully opening degree when the clutch assembly 20 has been actuated into the partial torque transmission condition, the first to fourth single-shot multivibrators 81 to 84 deliver the pulses $P_1$ to $P_4$ successively after the switch actuating plunger 45 in the clutch actuator 33 has reached the initial engagement point IEP. In this instance, the exciting coil 53i of the third valve unit 53 is kept energized and accordingly the switch actuating plunger 45 is kept moved at the velocity proportional to the flow rate $f_3$ of air through the second port 53d of the valve unit 53 as indicated by lines $D_1$–$D_2$, $D_2$–$D_3$, $D_3$–$D_4$ and $D_4$–E of the plot illustrated in FIG. 3B after the plunger 45 has reached the initial engagement point IEP. If, however, the accelerator pedal 30 is kept depressed relatively slowly to a position providing a throttle valve opening degree greater than the predetermined third value before the clutch assembly 20 is fully coupled, the first to fourth single-shot multivibrators 81 to 84 will be triggered to produce the pulses $P_1$ to $P_4$ at certain intervals so that the exciting coil 53i of the third valve 53 is energized intermittently when the clutch assembly 20 is in the partial torque transmission condition, as will be seen from the plot of FIG. 3C. In FIG. 3C, lines $D_1$–$E_1$, $D_2$–$E_2$, $D_3$–$E_3$ and $D_4$–$E_4$ indicate the movement of the switch actuating plunger 45 at the velocity proportional to the flow rate $f_3$ of air through the second port 53d of the third valve unit 53 in response to the pulses $P_1$, $P_2$, $P_3$, and $P_4$, respectively, while lines $E_1$–$D_2$, $E_2$–$D_3$ and $E_3$–$D_4$ and the line leading from the point $E_4$ indicate the movement of the switch actuating plunger 45 as dictated by the flow rate $f_4$ of air through the second port 54d of the fourth valve unit 54 with the exciting coil 54i of the valve unit 54 assumed to be de-energized when the exciting coil 53i of the third valve unit 53 is de-energized.

What is claimed is:

1. An apparatus for controlling a clutch assembly of a driveline of an automotive vehicle having a manually operated power transmission system, said clutch assembly being operative between a fully coupled condition and a fully uncoupled condition through an allowance disengagement condition and a partial torque transmission condition, comprising a clutch actuating mechanism including a control chamber contractable and expansible between a maximum-volume condition producing said fully coupled condition in the clutch assembly and a minimum-volume condition producing said fully uncoupled condition in the clutch assembly, an electrically operated valve arrangement including a vacuum port for providing communication between said control chamber and a source of vacuum and a plurality of air ports each for providing communication between said control chamber and the open air, said vacuum port being open to develop vacuum in the control chamber for causing the control chamber to contract toward said minimum-volume condition, said air ports having different cross sectional areas and being selectively opened to admit atmospheric air into said control chamber at different rates for causing the control chamber to expand at different rates and accordingly driving the clutch assembly at different velocities toward said fully coupled condition, and an electric control circuit including clutch position detecting means responsive to transition of the clutch assembly between said allowance disengagement condition and said partial torque transmission condition and throttle-valve position responsive means responsive to variation in the degree of opening degree of the throttle valve of the mixture supply system of the vehicle engine, said control circuit being effective to cause said valve arrangement to close said vacuum port in response to a predetermined condition in which the clutch assembly is to be coupled, said control circuit being further operative to cause the air port with the largest sectional area to open and communicate with said control chamber under said allowance disengagement condition of the clutch assembly and to close in response to the transition of the clutch assembly from the allowance disengagement condition into the partial torque transmission condition as detected by said clutch position detecting means and to cause the remaining air ports to selectively open and communicate with said control chamber for causing the control chamber to expand at stepwise varying rates in response to variation in the throttle opening degree detected by said throttle responsive means under the partial torque transmission condition of the clutch assembly.

2. An apparatus as set forth in claim 1, in which said throttle-valve position responsive means comprises a plurality of throttle-valve position sensors responsive to throttle valve opening degrees of different predetermined values and in which said control circuit further comprises a vehicle speed sensor responsive to a vehicle speed of a predetermined level, said control circuit being operative to actuate said valve arrangement to cause said control chamber to expand at a relatively low rate in response to a throttle valve opening degree smaller than all of said predetermined values during the partial torque transmission condition of the clutch assembly and at a relatively high rate for a predetermined period of time each time the throttle valve opening degree exceeds the value predetermined for each of said throttle valve sensors provided the vehicle speed detected by said vehicle speed sensor is lower than said predetermined level.

3. An apparatus as set forth in claim 2, in which said valve arrangement comprises first, second, third and fourth valve units each having first, second and third ports and a first condition providing communication between the first and third ports thereof and a second condition providing communication between the first and second ports thereof, the first port of said first valve unit being in constant communication with said control chamber, the second port of said first valve unit constituting said vacuum port, the respective first ports of said second, third and fourth valve units being in constant communication with the respective third ports of said first, second and third valve units, respectively, the respective second ports of said second, third and fourth valve units and the third port of the fourth valve unit constituting said air ports, the second port of said second valve unit constituting said air port with the largest sectional area, the third port of said fourth valve unit being smaller in cross sectional area than the second port of said third valve unit and larger in cross sectional area than the second port of the fourth valve unit, said relatively low rate of expansion of the control chamber being provided by the second port of said second valve unit and said relatively high rate of expansion of the control chamber being provided by one of the second and third ports of said fourth valve units, said control circuit being operative to control said valve arrangement so as to operate the first valve unit in the first condition thereof and the second valve unit in the second condition thereof under the allowance disengagement condition of the clutch assembly and to hold both of the first and second valve units in the respective second condition thereof, said throttle valve position sensors and said vehicle speed sensor being electrically connected to said third valve unit and operative to actuate the third valve unit into said second condition thereof for a predetermined period of time each time the throttle valve opening degree exceeds the particular value predetermined for each of the throttle-valve position sensors provided the vehicle speed detected by said vehicle speed sensor is lower than said level.

4. An apparatus as set forth in claim 3, in which said throttle-valve position sensors are operative to produce a logic "1" output signals in response to throttle valve opening degrees greater than said predetermined values, respectively, and said vehicle speed sensor is operative to produce a logic "1" output signal in response to a vehicle speed lower than said predetermined level and in which said control circuit further comprises a clutch position sensor operative to produce a logic "0" output signal in response to the fully engaged condition or the allowance disengagement condition of the clutch assembly and a logic "1" output signal in response to the fully disengaged condition or the partial torque transmission condition of the clutch assembly, a plurality of logic "NAND" gate circuits each having first and second input terminals, a plurality of single-shot multivibrators having their respective trigger terminals connected to the respective output terminals of said "NAND" gate circuits and each having first and second output terminals for producing logically opposite output pulses having predetermined pulsewidths, each of said multivibrators being adapted to be triggered by a logic "0" input signal for producing logically "1" and "0" pulses at its first and second output terminals, respectively, and a logic "NOR" gate circuit having a plurality of input terminals respectively connected to the respective first output terminals of said multivibrators and an output terminal connected through a logic "NOT" gate circuit to said third valve unit for actuating the third valve unit into the second condition thereof in the presence of a logic "0" signal at the output terminal of said "NOR" gate circuit, one of said "NAND" gate circuits having its first input terminal connected to said vehicle speed sensor and its second input terminal connected to said clutch position sensor and the remaining "NAND" gate circuits having their respective first input terminals connected to the respective second output terminals of said multivibrators, each of the multivibrators connected to said remaining "NAND" gate circuit having a clear terminal for being held inoperative pending the lapse of the pulse produced from the multivibrator having its second output terminal connected to the trigger terminal through each of said "NAND" gate circuit.

5. An apparatus as set forth in claim 3, in which said vehicle speed sensor is operative to produce a logic "0" output signal, each of said first to fourth single-shot multivibrators being adapted to be triggered by a logic "0" input signal for producing logically "1" and "0" output signals at its first and second output terminals, respectively, and in which said throttle-valve position sensors consist of first, second and third throttle-valve position sensors which are operative to produce logic "1" output signals in response to throttle valve opening degrees greater than predetermined first, second and third values, respectively, which are greater in this sequence, said control circuit further comprising a clutch position sensor operative to produce a logic "0" output signal in response to the fully coupled condition or the allowance disengagement condition of the clutch assembly and a logic "1" output signal in response to the fully uncoupled condition or the partial torque transmission condition of the clutch assembly, first to fourth logic

"NAND" gate circuits each having first and second input terminals, first to fourth single-shot multivibrators having their respective trigger terminals connected to the respective output terminals of said first to fourth "NAND" gate circuits and each having first and second output terminals for producing logically opposite output pulses having predetermined pulsewidths, each of said first to fourth single-shot multivibrators being adapted to be triggered by a logic "0" input signal for producing logically "1" and "0" output signals at its first and second output terminals, respectively, and a logic "NOR" gate circuit having first to fourth input terminals connected to the respective first output terminals of said multivibrators and an output terminal connected through a logic "NOT" gate circuit to said third valve unit for actuating the third valve unit into said second condition thereof in the presence of a logic "0" signal at the output terminal of said "NOR" gate circuit, the first "NAND" gate circuit having its first input terminal connected to said vehicle speed sensor and its second input terminal connected to said clutch position sensor for delivering a logic "0" output signal to said first single-shot multivibrator when the vehicle speed is lower than said predetermined level with the clutch assembly in said partial torque transmission condition, the second "NAND" gate circuit having its first input terminal connected to the second output terminal of said first single-multivibrator and its second input terminal connected to said first throttle-valve position sensor for delivering a logic "0" output signal to said second single-shot multivibrator in response to a throttle valve opening degree larger than said first valve and simultaneously to a logically "1" signal appearing at the second output terminal of said first single-shot multivibrator, said third "NAND" gate circuit having its first input terminal connected to the second output terminal of said second single-shot multivibrator and its second input terminal connected to said second throttle-valve position sensor for delivering a logic "0" output signal to said third single-shot multivibrator in response to a throttle valve opening degree larger than said second value and simultaneously to a logically "1" signal appearing at the second output terminal of said second single-shot multivibrator, and said fourth "NAND" gate circuit having its first input terminal connected to the second output terminal of said third single-shot multivibrator and its second input terminal connected to said third throttle-valve position sensor for delivering a logic "0" output signal to said fourth single-shot multivibrator in response to a throttle valve opening degree larger than said third value and simultaneously to a logic "1" signal appearing at the second output terminal of said third single-shot multivibrator, each of said second to fourth single-shot multivibrator having a clear terminal for maintaining the second, third and fourth single-shot multivibrators inoperative pending the lapse of the pulses from the first, second and third single-shot multivibrators.

6. An apparatus as set forth in claim 5, in which said control circuit further comprises a logic "NOR" gate circuit having a first input terminal connected through a logic "NOR" gate circuit to said vehicle speed sensor, a second input terminal connected to the first output terminal of said first single-shot multivibrator and an output terminal connected to the clear terminal of said second single-shot multivibrator, a logic "NAND" gate circuit having a first input terminal connected to the output terminal of the last named "NOR" gate circuit, a second input terminal connected to the second output terminal of said second single-shot multivibrator and an output terminal connected through a logic "NOT" gate circuit to the clear terminal of said third single-shot multivibrator, and a logic "NOR" gate circuit having a first input terminal connected to the output terminal of the last named "NAND" gate circuit, a second input terminal connected to the first output terminal of said third single-shot multivibrator and an output terminal connected to the clear terminal of said fourth single-shot multivibrator.

* * * * *